(12) United States Patent
Ans et al.

(10) Patent No.: US 10,515,347 B2
(45) Date of Patent: Dec. 24, 2019

(54) TECHNIQUES FOR KIOSK TRANSACTIONS

(71) Applicant: NCR Corporation, Duluth, GA (US)

(72) Inventors: Venkataramana Ans, Hyderabad (IN); Marreddy Thumma, Hyderabad (IN)

(73) Assignee: NCR Corporation, Atlanta, GA (US)

(*) Notice: Subject to any disclaimer, the term of this patent is extended or adjusted under 35 U.S.C. 154(b) by 101 days.

(21) Appl. No.: 14/169,919

(22) Filed: Jan. 31, 2014

(65) Prior Publication Data

US 2014/0324610 A1    Oct. 30, 2014

(51) Int. Cl.
*G06Q 20/10* (2012.01)
*G06Q 20/18* (2012.01)
*G06Q 20/32* (2012.01)

(52) U.S. Cl.
CPC ......... *G06Q 20/1085* (2013.01); *G06Q 20/18* (2013.01); *G06Q 20/3223* (2013.01)

(58) Field of Classification Search
CPC .. G06Q 20/1085; G06Q 20/18; G06Q 20/322; G06Q 20/3223
USPC .................... 705/21, 16, 18, 39, 26.35, 27.1
See application file for complete search history.

(56) References Cited

U.S. PATENT DOCUMENTS

| | | | | |
|---|---|---|---|---|
| 7,606,767 B1 * | 10/2009 | Couper | ............... | G06Q 20/105 705/41 |
| 7,640,006 B2 * | 12/2009 | Portman | ............... | G06Q 30/02 379/88.01 |
| 8,083,141 B1 * | 12/2011 | Courtright | ......... | G06Q 20/1085 235/380 |
| 8,294,554 B2 * | 10/2012 | Shoarinejad | ............ | G01S 7/003 340/10.1 |
| 9,290,927 B1 * | 3/2016 | Sheley | .................. | G07F 19/205 |
| 2003/0154139 A1 * | 8/2003 | Woo | ...................... | G06Q 20/04 705/16 |
| 2004/0019564 A1 * | 1/2004 | Goldthwaite | .......... | G06Q 20/04 705/44 |
| 2004/0122771 A1 * | 6/2004 | Celi, Jr. | ............. | G06Q 20/1085 705/43 |
| 2009/0070257 A1 * | 3/2009 | Csoka | .................... | G06Q 20/10 705/39 |
| 2011/0137797 A1 * | 6/2011 | Stals | ...................... | G06Q 20/02 705/44 |
| 2011/0249081 A1 * | 10/2011 | Kay | .................... | H04M 3/5315 348/14.03 |
| 2012/0266258 A1 * | 10/2012 | Tuchman | .............. | H04L 63/104 726/28 |
| 2013/0054468 A1 * | 2/2013 | Fuentes | .................. | G06Q 40/02 705/64 |
| 2013/0191232 A1 * | 7/2013 | Calman | ................. | G07F 19/201 705/18 |
| 2014/0156506 A1 * | 6/2014 | Grigg | ................. | G06Q 20/3223 705/39 |
| 2014/0324638 A1 * | 10/2014 | Khalid | ................... | H04W 4/70 705/27.1 |

* cited by examiner

Primary Examiner — Vanel Frenel

(74) Attorney, Agent, or Firm — Schwegman, Lundberg & Woessner

(57) ABSTRACT

Techniques for transacting with a kiosk are provided. A user activates a remoting feature of a kiosk. A kiosk agent on the kiosk directly or indirectly causes a link to be sent to a mobile device of the user. The link when activated on the mobile device providing an interface for transacting with the kiosk from the mobile device.

3 Claims, 3 Drawing Sheets

TECHNIQUES FOR KIOSK TRANSACTIONS

BACKGROUND

Consumers are increasingly using kiosks to conduct business with enterprises. The kiosks come in a variety of sizes and are used for a variety of purposes. Some kiosks are drive through, such as fast food establishments, pharmacies, banks, and the like. Other kiosks are stationary located in gas stations, airlines, grocery stores, department stores, and the like.

One type of kiosk, an Automated Teller Machine (ATM) has not evolved very much since it was first introduced many decades ago. An ATM still largely functions in the manner it did when it was first introduced: a customer swipes or inserts a bank card, the customer then enters a Personal Identification Number (PIN), the customer selects a transaction, and the transaction completes.

ATMs are located in a variety of locations for the convenience of consumers: some are drive thru, some in stores, some at sporting or entertainment locations, and the like. ATMs require security and include architectures similar to traditional computers; however, ATMs also require a variety of peripheral devices that often require maintenance, such as displays, keypads, card readers, and the like. Thus, ATMs are expensive to maintain and operate.

In addition, in recent years some banks have been updating display monitors and processing capabilities of their ATMs to provide a greater variety of transactions available to their customers. For example, providing access to an interactive teller remotely via a video feed to the ATM is a feature that is becoming very popular.

The problem is that these newer kiosks are only sparsely available and are usually tied to the bank locations. Moreover, some ATMs are now available are headless meaning that the completely lack a display monitor, which is a less expensive approach for a bank and provides better security for the customers. So, installing monitors on headless ATMs to provide an interactive teller feature would defeat the very purpose of a headless ATM.

SUMMARY

In various embodiments, techniques for kiosk transactions are presented. According to an embodiment, a method for processing a kiosk transaction is provided.

Specifically, a user is authenticated for access to transact with the kiosk. Next, a remoting feature is detected as being activated by the user at the kiosk. Then, a link is caused to be sent to a mobile device of the user in response to the remoting feature being activated. Finally, the user is permitted to continue transacting via the kiosk using the mobile device when the link is activated on the mobile device.

DETAILED DESCRIPTION

Figure 1:
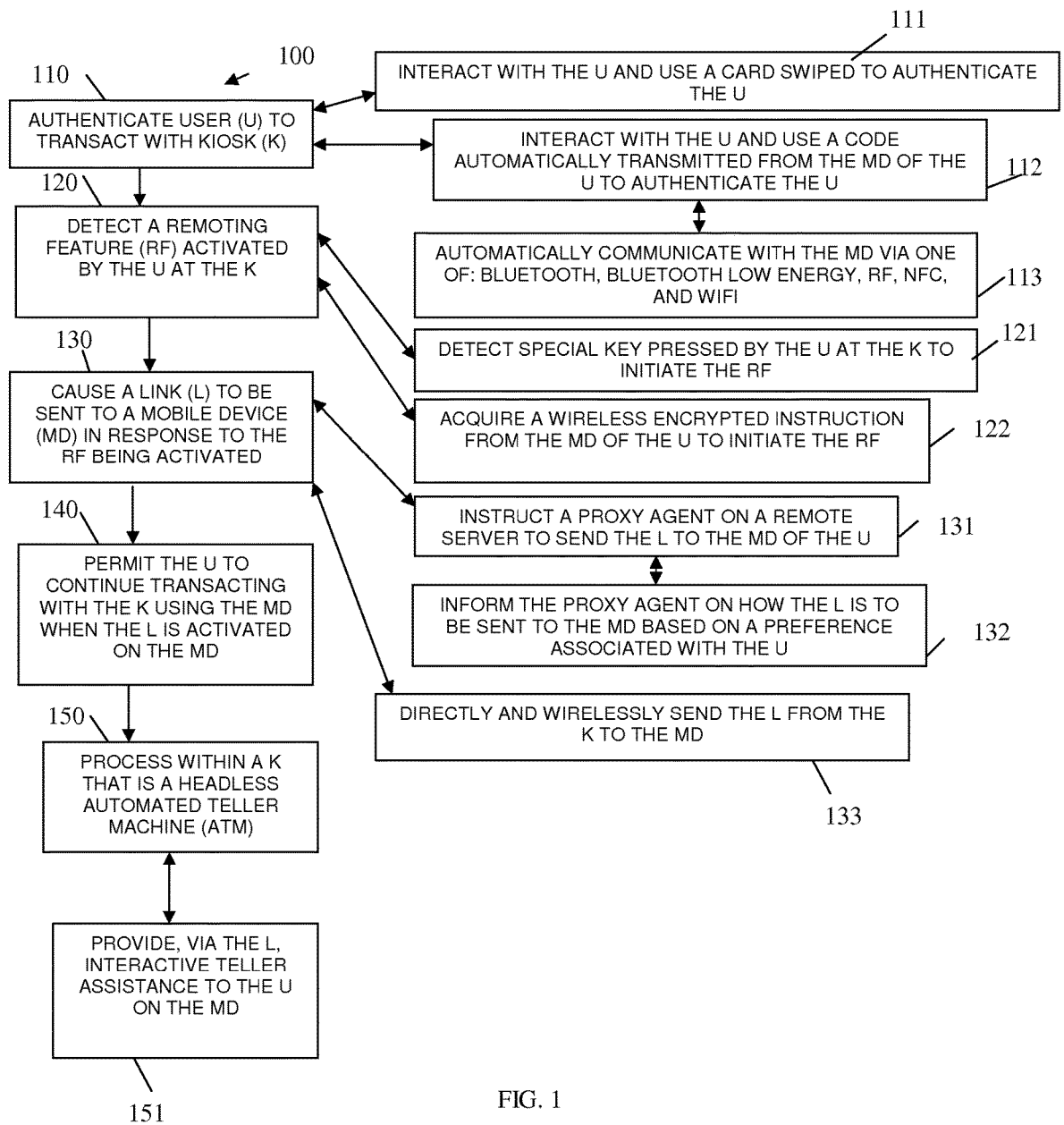
FIG. 1 is a diagram of a method for transacting via a kiosk, according to an example embodiment.

FIG. 1 is a diagram of a method 100 for transacting via a kiosk, according to an example embodiment. The method 100 (hereinafter "kiosk agent") is implemented as instructions programmed and residing on a non-transitory computer-readable (processor-readable) storage medium and executed by one or more processors or kiosk device (e.g., ATM, Point-Of-Sale (POS) device, etc.). The processors are specifically configured and programmed to process the kiosk device. The kiosk agent operates over a network. The network is wired, wireless, or a combination of wired and wireless.

The kiosk agent interacts directly or indirectly (via a proxy) with mobile device of a consumer. The mobile device can be a phone, a tablet, a laptop, a wearable processing device, and the like. It is noted that the kiosk can be a self-service terminal or a cashier-manned terminal. Thus, the kiosk can be a Point-Of-Sale (POS) terminal manned or unmanned and self-service.

In an embodiment, the kiosk agent processes on an ATM that lacks a monitor (headless ATM).

In another embodiment, the kiosk agent processes on an ATM that includes a monitor that lacks video capabilities.

At 110, the kiosk agent authenticates a user to transact with a kiosk. The user is physically present at a location of the kiosk. The user has to provide something in the user's possession in addition a secret, such as a Personal Identification Number (PIN). The manner in which the user provides a code in the user's possession can vary.

For example, at 111, the kiosk agent interacts with the user to use a card that is swiped to authenticate the user. It is noted that a smart card equipped with an RFID can be used as well, such that as long as the card is in a configured proximity to the kiosk the card number, code, or details can be obtained from the user.

In another case, at 112, the kiosk agent interacts with the user and automatically acquires a code transmitted from the mobile device of the user for purposes of authenticating the user.

Continuing with the embodiment of 112 and at 113, the kiosk agent automatically communicates with the mobile device via one of: a Bluetooth mechanism, a Bluetooth Low Energy (BLE) mechanism, a Radio Frequency (RF) mechanism, a Near Field Communication (NFC) mechanism, and a WiFi mechanism.

At 120, the kiosk agent detects a remoting feature activated by the user at the kiosk. Here, the user either directly activates an input mechanism of the kiosk to initiate the remoting feature or the user can use mechanisms available on the user's mobile device to activate the remoting feature of the kiosk.

As used herein, the "remoting feature" refers to an ability to transfer the transaction with the kiosk to a remote agent (automated or manual) where the transaction continues via the mobile device of the user. The remote agent can have access to the kiosk to cause the kiosk to complete certain aspects of the transaction, such as dispensing cash. The "remoting feature" can also permit the kiosk to continue to process the transaction but the kiosk uses instructions sent from the remote agent that the user interacts with via an interface presented on the mobile device.

According to an embodiment, at 121, the kiosk agent detects a special input key pressed by the user at the kiosk to initiate the remoting feature. So, a special key can be set aside or even special key sequence that the user activates to initiate a request for the remoting feature.

In another case, at 122, the kiosk agent acquires a wireless encrypted instruction from the mobile device of the user to initiate the remoting feature. In this scenario, the user can have a mobile app registered on the mobile device that permits authentication and providing the remoting feature instruction to the kiosk via wireless communications between the kiosk and the mobile device of the user. The manner in which the request is sent to the kiosk can occur via any wireless communication mechanism, such as those listed above with respect to the processing described at 113.

At 130, the kiosk agent causes a link to be sent to a mobile device of the user based on or in response to the remoting feature being activated. In an embodiment, the link is a Uniform Resource Locator (URL) or Universal Resource Identifier (URI) encoded link that is activated via a web browser on the mobile device of the user and the mobile device is a phone, a tablet, a laptop, or a wearable processing device.

In an embodiment, at 131, the kiosk agent instructs a proxy agent on a remote server to send the link to the mobile device of the user on behalf of the kiosk agent. The proxy agent is described in greater detail below with reference to the FIGS. 2 and 3.

Continuing with the embodiment of 131 and at 132, the kiosk agent informs the proxy agent on how the link is to be sent to the mobile device based on a preference associated with the user. So, the user can register a profile that tells the kiosk the user wants to receive the link as: a text, an email, a message to an app, etc.

In an embodiment, at 133, the kiosk agent directly and wirelessly sends the link from the kiosk to the mobile device. So, the kiosk agent can include the information about the remote server and remote agent that are used to continue the transaction on the mobile device of the user within a link that the kiosk wirelessly transmits to the mobile device of the user. In this scenario, the proxy agent is unnecessary.

At 140, the kiosk agent permits the user to continue transacting with the kiosk using the mobile device when the link is activated on the mobile device. In other words, the remoting feature is activated and being used. Continuation of the transaction can include suspending the transaction while the user interacts with the remote agent.

According to an embodiment, at 150, the kiosk agent processes within a kiosk that is a headless ATM. This was stated above as well.

Continuing with the embodiment of 150 and at 151, the kiosk agent provides, via the link, interactive teller assistance to the user on the mobile device. So, a legacy headless ATM can be used to provide state-of-the art and enhanced interactive teller assistance to a user where a real human remote agent (manual) is available to assist the user with a wide variety of transactions some that may be available on the ATM but the user needs assistance with them and some that may not be available on the ATM. In an embodiment, the assistance is a two way video call between the user and a teller occurring on the user's mobile device.

Figure 2:
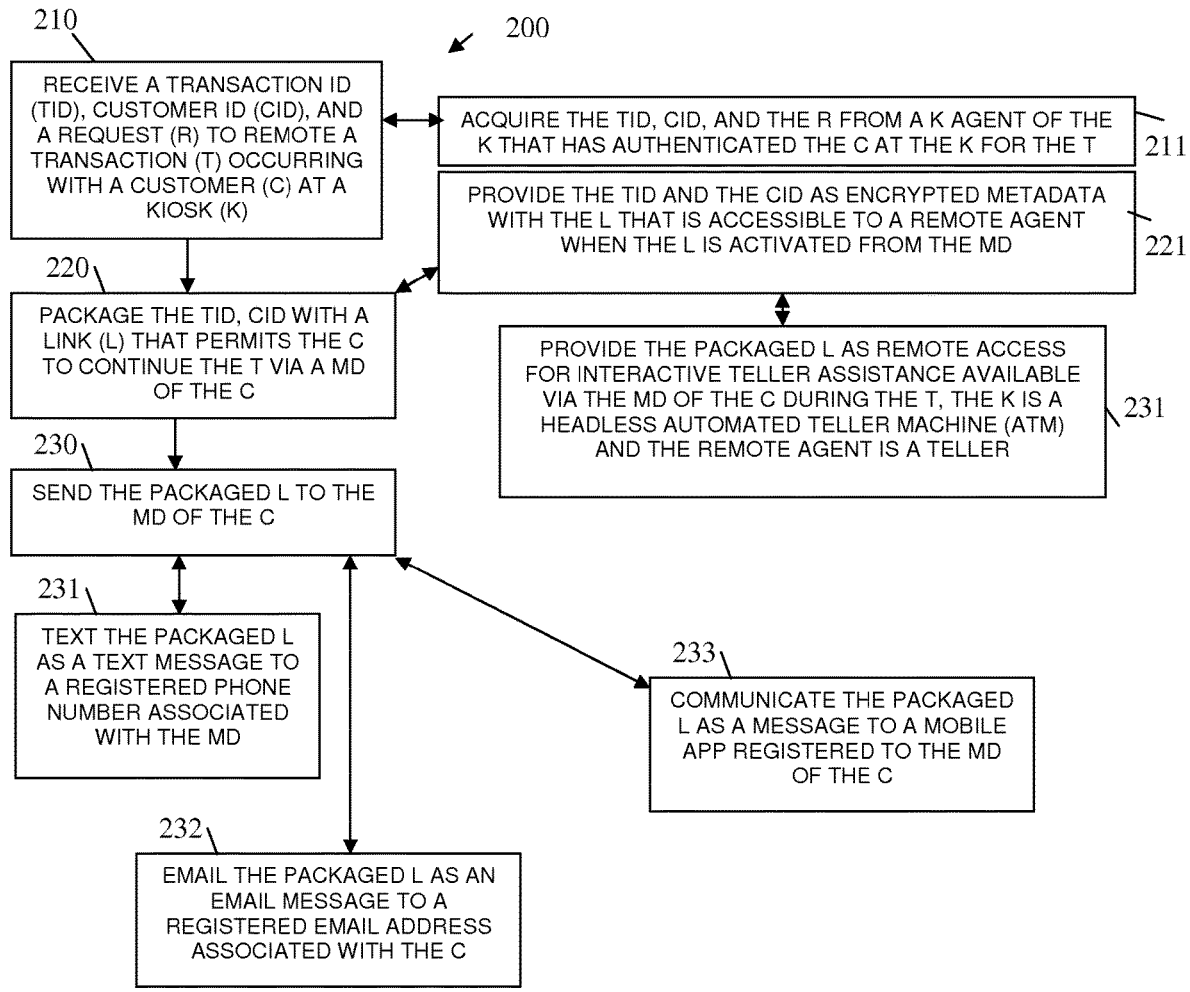
FIG. 2 is a diagram of another method for transacting via a kiosk, according to an example embodiment.

FIG. 2 is a diagram of another method 200 for transacting via a kiosk, according to an example embodiment. The method 200 (hereinafter "proxy agent") is implemented as instructions and programmed within a non-transitory computer-readable (processor-readable) storage medium that executes on one or more processors of a server device. The proxy agent is also operational over a network; the network is wired, wireless, or a combination of wired and wireless.

The proxy agent interacts with the kiosk agent described above with reference to the FIG. 1 to provide novel techniques for transacting with a kiosk via a mobile device.

At 210, the proxy agent receives a transaction identifier, a customer identifier, and a request to remote a transaction (remoting feature) that is occurring with a customer at a kiosk. Again, the customer is physically present or in a configured proximity of the kiosk when the proxy agent receives the request, transaction identifier, and customer identifier.

According to an embodiment, at 211, the proxy agent acquires the transaction identifier, the customer identifier, and the request from a kiosk agent of the kiosk that has already authenticated the customer at the kiosk for the transaction. An example kiosk agent was presented above in detail with reference to the FIG. 1.

It is also noted that the proxy agent communicates securely with the kiosk agent.

At 220, the proxy agent packages the transaction identifier and the customer identifier with a link that permits the customer to continue the transaction with a mobile device of the customer.

In an embodiment, at 221, the proxy agent provides the transaction identifier and the customer identifier as encrypted metadata with the link, such that the information is available and accessible to a remote agent (manual or automated) when the link is activated from the mobile device of the customer.

Continuing with the embodiment of 221 and at 222, the proxy agent provides the packaged link as remote access for interactive teller assistance available via the mobile device of the customer during the transaction. The kiosk in this scenario, in one instance, is a headless ATM and the remote agent, in one instance, is a human teller accessible via a video call occurring on the mobile device of the customer.

At 230, the proxy agent sends the packaged link to the mobile device of the customer. This can occur in a variety of ways.

For example, at 231, the proxy agent sends the packaged link as a text message that is texted to a registered phone number associated with the customer's mobile device (a phone or a processing device having a phone number such that it can receive a text message).

In another case, at 232, the proxy agent sends the packaged link as an email message to a registered email address associated with the customer or the customer's mobile device. The customer accesses the email while at the kiosk via the mobile device of the customer.

In yet another situation, at 233, the proxy agent communicates the packaged link as a message to a mobile app registered to the mobile device of the customer. So, communication between the proxy agent and the mobile device can occur via custom mobile app mechanisms or as discussed at 231 and 232 via conventional communication mechanisms available to mobile devices.

It should also be noted that other metadata can be received with the request or included with the link, such as audit, authentication, and/or metric data.

Figure 3:
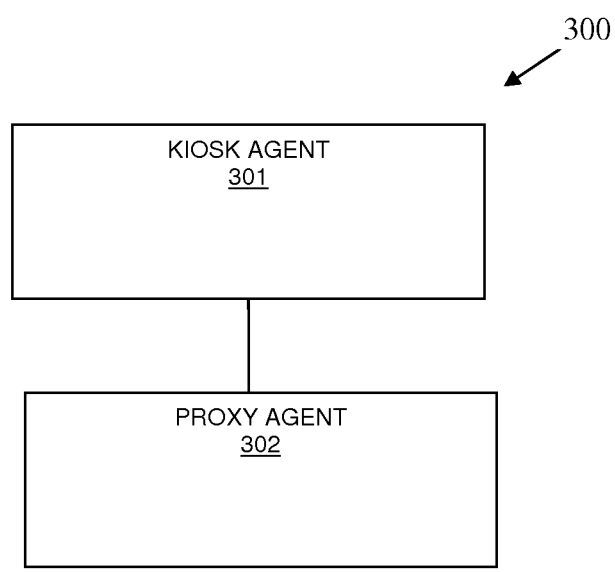
FIG. 3 is a diagram of a kiosk transaction system, according to an example embodiment.

FIG. 3 is a diagram of a kiosk transaction system 300, according to an example embodiment. The components of the kiosk transaction system 300 are implemented as executable instructions and programmed within a non-transitory computer-readable (processor-readable) storage medium that execute on one or more processors of one or more devices; the processors of these devices are specifically configured to execute the components of the kiosk transaction system 300. The kiosk transaction system 300 is also operational over a network; the network is wired, wireless, or a combination of wired and wireless.

The kiosk transaction system 300 includes a kiosk agent 301 and a proxy agent 302. Each of these components and the interactions of each component are now discussed in turn.

The kiosk transaction system 300 includes one or more processors of kiosk, the processors having memory programmed with a kiosk agent 301. The processors execute the kiosk agent 301. Example processing associated with the kiosk agent 301 was presented in detail above with reference to the FIG. 1.

The kiosk agent 301 is configured to authenticate a user for a transaction with the kiosk and to detect a remoting feature activated by the user at the kiosk. Moreover, the kiosk agent 301 is configured to instruct the proxy agent 302 to send a link to a mobile device of the user and when the link is activated from the mobile device, the transaction continues with the kiosk via an interface associated with the link from the mobile device. Essentially, the kiosk transaction occurs via the mobile device or suspends while actions occur on the mobile device independent of the kiosk. The details of this were discussed at length above with the discussions of the FIGS. 1 and 2.

The kiosk transaction system 300 includes one or more processors of a server machine, the processors having memory programmed with a proxy agent 302. The processors execute the proxy agent 302. Example processing associated with the proxy agent 302 was presented in detail above with reference to the FIG. 2.

The proxy agent 302 is configured to package the link and provide the link to the mobile device of the user. Details and examples of what is packaged and how it is sent were discussed above with reference to the FIG. 2.

According to an embodiment, the kiosk is a headless ATM and the interface is for remote interactive teller assistance provided on the mobile device to the user during the transaction.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. § 1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A processor-implemented method programmed in non-transitory processor-readable mediums and to execute on one or more processors of:
a server, a mobile device, and a kiosk with each configured to execute the method, comprising:
authenticating, by the kiosk, a customer for a transaction at the kiosk through a customer identifier, wherein the customer operating the kiosk to provide the customer identifier to the kiosk to initiate the transaction on the kiosk;
creating, by the kiosk, the transaction by assigning the transaction to a transaction identifier;
processing, by the kiosk, the transaction with the customer;
detecting, by the kiosk, a special input key that was inputted on the kiosk by the customer during the processing requesting assistance with the transaction that is ongoing at the kiosk;
suspending, by the kiosk, the transaction while the customer interacts with a remote agent identified as being requested by the user through activation of the special input key;
sending, by the kiosk, the transaction identifier, the customer identifier, and a request for a transaction assistance to the server based on the detecting while the customer remains at the kiosk;
receiving, by the server, the transaction identifier, the customer identifier, and the request for the transaction assistance session during the transaction being processed for the customer at the kiosk;
packaging, by the server, the transaction identifier and the customer identifier with a link that permits the customer to continue the transaction via the mobile device of the customer;
sending, by the server, the packaged link to the mobile device of the customer as Uniform Resource Locator Link that is texted to the mobile device;
establishing, by the mobile device, the two-way video call between the remote assistant and the customer via the mobile device of the customer when the link is activated on the mobile device by the customer and causing a browser on the mobile device to activate and process the link to connect the mobile device to a remote assistance device associated with the assistant;
causing, by the kiosk, continuation of the transaction at the kiosk by continuing to process the transaction with the customer based on the establishing;
allowing, by the kiosk, the remote assistant to remotely operate the kiosk to complete a portion of the transaction on behalf of the customer while the customer is remains at the kiosk for the transaction; and
completing, by the kiosk, the transaction based at least in part on the portion of the transaction that was remotely provided to the kiosk by the remote assistant.

2. The method of claim 1, wherein packaging further includes providing the transaction identifier and customer identifier as encrypted metadata with the link that is accessible to a remote agent when the link is activated from the mobile device.

3. The method of claim 2, wherein packaging further includes providing the packaged link as remote access for interactive teller assistance available via the mobile device of the customer during the transaction, wherein the kiosk is a headless Automated Teller Machine (ATM) and wherein the remote agent is a teller.

* * * * *